H. MONROE, Jr.
GRAIN RAKE.
APPLICATION FILED JUNE 3, 1913.
1,135,831.
Patented Apr. 13, 1915.
3 SHEETS—SHEET 1.
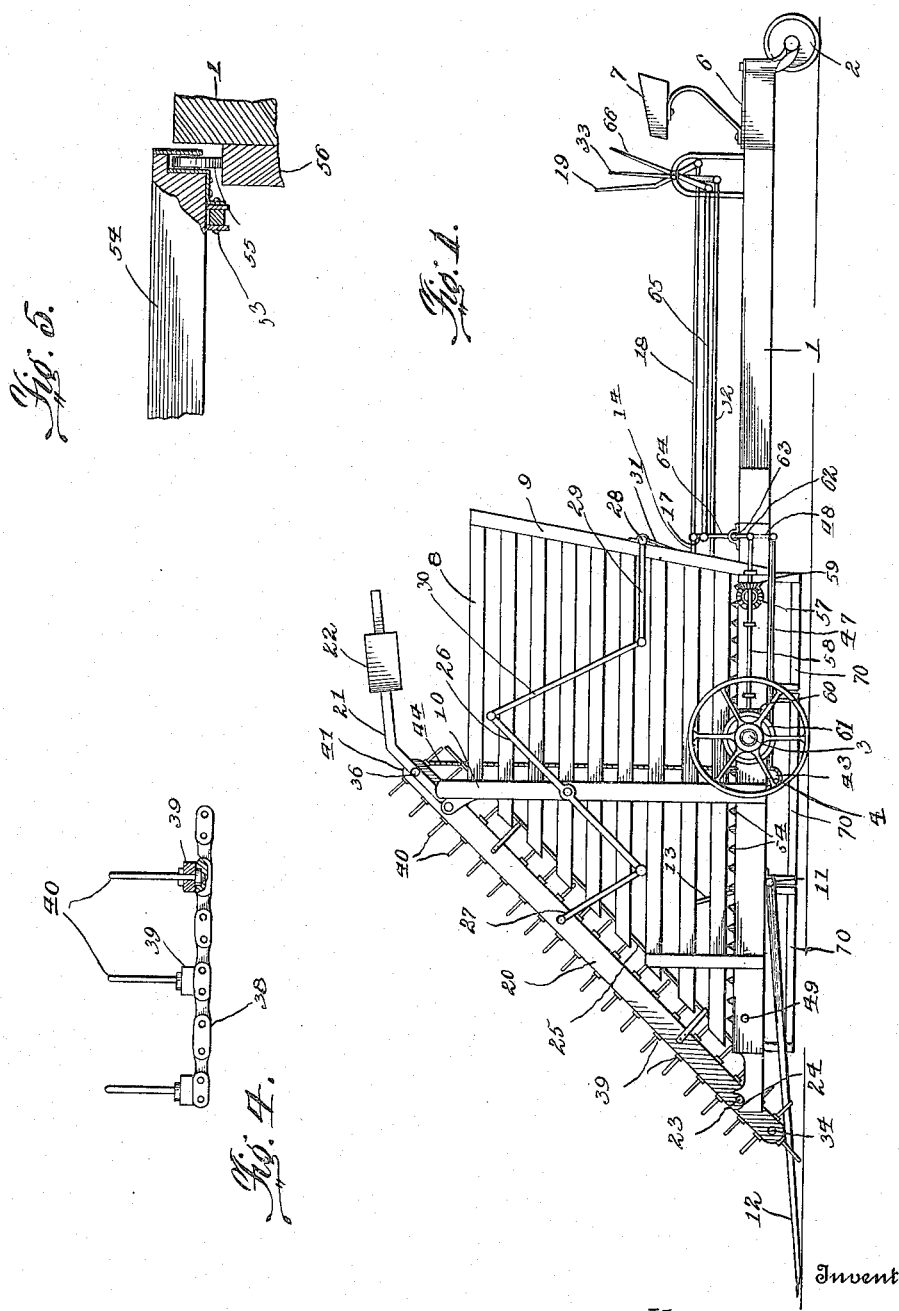
Witnesses
Frederick L. Fre.
K. Peacock
Inventor
Henry Monroe Jr.
By Victor J. Evans,
Attorney

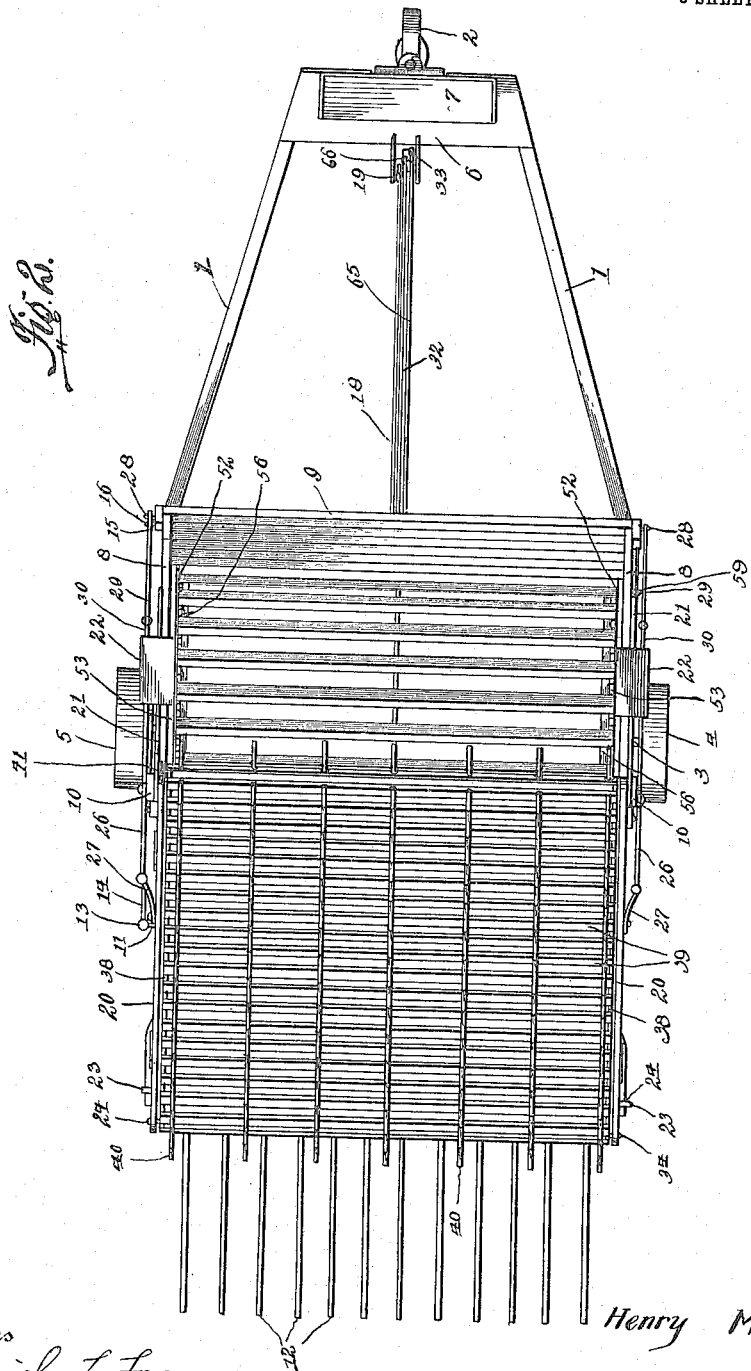

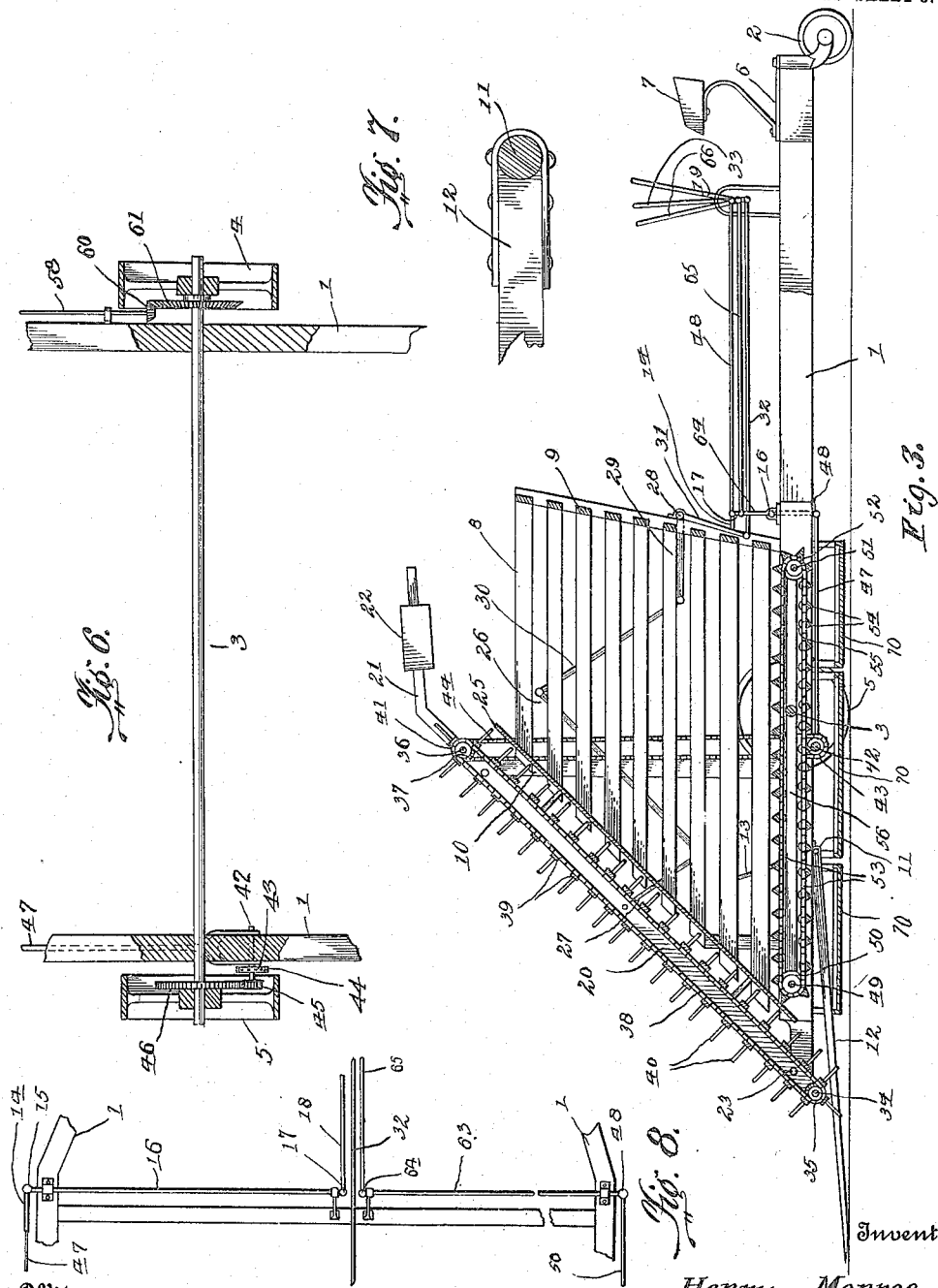

UNITED STATES PATENT OFFICE.

HENRY MONROE, JR., OF FAIRVIEW, KANSAS.

GRAIN-RAKE.

1,135,831.  Specification of Letters Patent.  Patented Apr. 13, 1915.

Application filed June 3, 1913. Serial No. 771,395.

*To all whom it may concern:*

Be it known that I, HENRY MONROE, Jr., a citizen of the United States, residing at Fairview, in the county of Brown and State of Kansas, have invented new and useful Improvements in Grain-Rakes, of which the following is a specification.

This invention has relation to a grain rake and it consists in the novel features hereinafter described and claimed.

The object of the invention is to provide a rake of the character indicated of the sweep type having features for facilitating the loading of the rake and other features for assisting in dumping the same of its contents.

With this object in view, the rake comprises a wheel mounted frame upon which is mounted a body. Tines are pivotally connected with the frame and the body and means is provided for raising and lowering the tines with relation to the surface of the ground. The body is provided with a slatted bottom mounted upon endless chains arranged to travel in orbits and means is provided for moving the said chains at intervals, the said means being adapted for operation from one of the supporting wheels of the frame. An elevator is pivotally mounted at the forward portion of the body and is adapted to receive the grain from the tines and carry the same up and deposit it in the body upon the said slats. Means is provided for raising and lowering the said elevator and also means is provided for operating the elevator when desired from one of the supporting wheels of the frame.

In the accompanying drawings—Figure 1 is a side elevation of the rake. Fig. 2 is a top plan view of the same. Fig. 3 is a longitudinal sectional view of the same. Fig. 4 is a side elevation of a portion of the elevator with parts in section. Fig. 5 is a detailed view of a portion of the bottom of the rake with parts in section. Fig. 6 is a horizontal sectional view of the lower intermediate portion of the rake. Fig. 7 is an enlarged side elevation of the end portion of one of the tines of the rake showing adjacent parts in section. Fig. 8 is a top plan view of shafts and connecting rods used upon the rake.

The rake comprises a frame 1 mounted at its rear end upon a caster wheel 2 and carrying at its intermediate portion an axle 3 upon which are journaled ground wheels 4 and 5. These wheels constitute the support for the frame. A platform 6 is mounted upon the rear portion of the frame 1 and a seat 7 is mounted upon the said platform.

A body is mounted upon the forward portion of the frame 1 and the said body consists of sides 8 and a back 9. Standards 10 are mounted upon the frame 1 and extend vertically along the outer surfaces of the sides 8 and project somewhat above the upper edges of the said sides.

A shaft 11 is journaled under the forward portion of the frame 1 and the rear ends of tines 12 are fixed to the shaft 11. The free ends of the tines 12 project in front of the forward end of the frame 1. An upstanding arm 13 is rigidly fixed to the shaft 11 and the forward end of a rod 14 is pivotally connected with the upper end of the said arm 13 and the rear end of the said rod 14 is pivotally connected with the end of an arm 15 fixed to a shaft 16 journaled behind the body of which the parts 8 and 9 are components. The shaft 16 is provided at its inner end with an upstanding arm 17 to which is pivotally connected the forward end of a bar 18. The rear end of the bar 18 is pivotally connected with a lever 19 which is fulcrumed upon a suitable support mounted upon the platform 6. Any suitable means may be provided for holding the lever 19 at an adjusted position. Therefore it will be seen that by swinging the lever 19 that the bar 18 is moved longitudinally whereby the shaft 16 is partially rotated and the rod 14 swings the arm whereby the shaft 11 is turned and the forward ends of the tines 12 may be raised or lowered.

An elevator frame 20 is pivotally connected with the upper ends of the standards 10 and an arm or a series of arms 21 extend rearwardly from the upper end of the said frame and each arm 21 is provided with a shiftable weight 22 whereby the said frame and the parts carried thereby may be counter balanced upon their pivotal connections with the standards 10. The frame 20 is provided at its sides with outstanding pins 23 which are adapted to enter notches 24 provided at the sides of the frame 1 when the forward portion of the frame 20 is in its lowermost position. Thus when the said pins 23 are in engagement with the bottom of the said notches, the entire weight of the said frame and the parts carried thereby is sustained by the standards 10 and the frame 1. A plate 25 is carried at the under side of the frame 20 and serves as a shield for a set of fingers hereinafter to be described.

A lever 26 is fulcrumed at a point approximately midway between its ends to one of the standards 10 and the forward end of the said lever is pivotally connected by means of a link 27 with the intermediate portion of the frame 20. A shaft 28 is journaled behind the back 9 of the body and carries a forwardly disposed arm 29. A link 30 pivotally connects the forward end of the arm 29 with the rear end of the lever 26. The shaft 28 also carries a downwardly disposed arm 31 and the forward end of a bar 32 is pivotally connected with the lower end of the last mentioned arm. The rear end of the bar 32 is pivotally connected with the lower end of a lever 33 which is fulcrumed upon a suitable support mounted upon the platform 6 and any appropriate means may be provided for holding the lever 33 at adjusted position. Therefore it will be seen that by swinging the lever 33, the bar 32 will be moved longitudinally whereby the arm 31 will rock the shaft 28 which in turn will swing the arm 29 and move the link 30 longitudinally. This movement on the part of the link 30 will swing the lever 26 whereby the link 27 is moved longitudinally and the trunk 20 is swung upon its pivotal connection with the standards 10. Thus it will be seen that means is provided for raising or lowering the free or forward end of the frame 20.

A shaft 34 is carried at the forward end of the frame 20 and sprocket wheels 35 are mounted upon the said shaft for rotation about the axis thereof. A shaft 36 is journaled for rotation at the upper portion of the frame 20 and carries sprocket wheels 37 which are in alinement with the sprocket wheels 35 carried by the shaft 34. Sprocket chains 38 trained around the sprocket wheels 35 and 37 are connected together by cross slats 39. These slats carry outstanding fingers 40 which when the frame 20 is in its lowered position are adapted to pass through the spaces between the tines 12 hereinbefore described. At the upper runs of the chains 38, the fingers 40 extend upwardly and forwardly while at the lower runs of the said chains, the fingers are disposed rearwardly and downwardly and are housed in front of the plate 25 which serves as a shield for preventing the fingers in their downward course of movement from becoming entangled with the straw which is deposited in the body of which the parts 8 and 9 are components.

A sprocket wheel 41 is fixed to one end of the shaft 36 and a stub shaft 42 is journaled below the frame 1. This shaft 42 is so mounted that it may be moved bodily in a direction longitudinally of the frame 1. The stub shaft 42 carries a sprocket wheel 43 and a sprocket chain 44 is trained around the sprocket wheels 41 and 43. The stub shaft 42 also carries a gear wheel 45 adapted to mesh with a gear wheel 46 attached to the side of the ground wheel 5. (See Fig. 6.) Therefore it will be seen that when the gear wheel 45 is in mesh with the gear wheel 46 rotary movement is transmitted from the ground wheel 5 to the stub shaft 42 and through the chain 44 such movement is transmitted to the shaft 36 which in turn causes the fingers 40 to move along the frame 20 as hereinbefore indicated. A rod 47 is slidable longitudinally of the frame 1 and the front end thereof is bifurcated as clearly shown in Fig. 6 to rotatably receive the stub shaft 42 and the rear end of the said rod 47 is attached to an arm 48 which depends from the shaft 16. Therefore when the shaft 16 is turned as hereinbefore described, the arm 48 is swung which in turn moves the rod 47 longitudinally and the stub shaft 42 is moved along the frame 1. When the tines 12 are raised at their forward ends above the ground, the stub shaft 42 is simultaneously moved so that the gear wheel 45 is carried out of mesh with the gear wheel 46 and consequently movement from the ground wheel 5 to the fingers 40 upon the frame 20 is interrupted when the tines 12 are raised. When the tines 12 are lowered, the gear wheel 45 is brought into mesh with the gear wheel 46 and consequently movement from the ground wheel 5 is transmitted through the intervening parts to the fingers 40 carried by the frame 20. A shaft 49 is carried at the forward end of the frame 1 and sprocket wheels 50 are mounted upon the shaft 49 for rotation about the axis thereof. A shaft 51 is journaled for rotation in the frame 1 in the vicinity of the back 9 of the body and carries sprocket wheels 52 which are in alinement with the sprocket wheels 50 hereinbefore mentioned. Sprocket chains 53 are trained around the sprocket wheels 50 and 52 and are connected together by cross slats 54. These slats 54 are triangular in transverse section and carry at their ends rollers 55 which are adapted to travel upon ledges 56 provided at the inner surfaces of the sides of the frame 1 whereby the upper runs of the chains and the uppermost set of slats are maintained approximately parallel with the horizontal plane of the frame 1. A beveled pinion 57 is fixed to one end of the shaft 51 and a shaft 58 is slidably mounted at one side of the frame 1. The shaft 58 carries a beveled pinion 59 which is adapted to mesh at times with the beveled pinion 57 and the said shaft 58 also carries a beveled pinion 60 adapted to be brought into mesh with a beveled gear wheel 61 fixed to the side of the ground wheel 4. The rear end of the shaft 58 is pivotally connected with the lower end of an arm 62 carried by a shaft 63 which is journaled upon the frame 1 behind the back 9. The forward end of a bar 65 is pivotally connected with the upper end of the arm 64 and the rear end of the said bar is pivotally connected with the lower end of a lever 66 which is journaled upon a suitable support provided upon the platform 6. Therefore it will be seen that by swinging nally whereby the arm 64 is swung and the shaft 63 is turned. As the said shaft is turned, the arm 62 is swung whereby the shaft 58 is moved longitudinally. Thus the beveled pinions 59 and 60 may be moved simultaneously into mesh with the pinion 57 and the gear wheel 61 or in a similar manner may be moved out of mesh with the said parts.

When the rake is moving in a forward direction and as the ground wheel 4 rotates, movement is transmitted from the said wheel through the intermeshing pinion 60 and wheel 61 to the shaft 68 which in turn transmits through the beveled pinions 59 and 57 rotary movement to the shaft 51 and as the said shaft 51 rotates, the chains 53 are moved longitudinally and the slats 54 at the upper runs of the said chains move toward the back 9 of the body. However when the rake structure is moved in a backward direction, the slats 54 at the upper runs of the chains 53 move toward the front end of the frame 1 and consequently when the rake is being dumped of its load, the slats at the upper runs of the said chains move in a forward direction and assist in the unloading of the rake. During the operation of loading the rake, the same is moved in a forward direction whereby the forward ends of the tines 12 pass under the straw which lies upon the surface of the ground scattered or in bundles. This straw is caught up by the fingers 40 and is carried up along the trunk 20 and is deposited into the body between the sides 8 and the back 9 and upon the slats 54. As the fingers 40 move in a downward direction along the under side of the frame 20, the plate 25 prevents the fingers from coming in contact with the hay in the body as above described.

After the rake has been loaded as above indicated, the tines and the frame 20 may be elevated as above described and then the rake may be pushed to any desired point. When arriving at the said point, the rake may be unloaded by backing the same after the gear wheels 59 and 60 have been moved in mesh with the pinion 57 and the wheel 61. Thus the slats 54 at the upper runs of the chains 53 will move toward the forward end of the rake and consequently the load is carried with the said slats and is deposited upon the tines from which it may slip to the ground.

From the above description, in connection with the accompanying drawings, it will be seen that a rake of simple structure is provided and that the said rake is practically automatic in its action in gathering and loading the hay and also in discharging the same from the body.

The rake is provided with a series of pan sections 70 which may catch any grain that is shelled from the straw during the movement of the same.

I claim:—

In combination, a wheel mounted frame, a hand lever pivoted to said frame, a shaft rotatably mounted in said frame, an arm on said shaft, a rod connecting one end of said hand lever with said arm, tines pivoted in said frame, connections between said shaft and said tines for raising and lowering the latter when said shaft is rotated, a loader supported on said frame, a rod slidable longitidinally of said frame and connected at one end with said shaft, a short shaft rotatably mounted in the opposite end of said rod, a gear wheel secured to one of the wheels of said frame, a gear wheel secured to said short shaft and movable into and out of mesh with the first-mentioned gear wheel, and driving connections between said short shaft and said loader.

In testimony whereof I affix my signature in presence of two witnesses.

HENRY MONROE, Jr.

Witnesses:
    JOHN M. KERR,
    F. G. MINGER.

Copies of this patent may be obtained for five cents each, by addressing the "Commissioner of Patents, Washington, D. C."